United States Patent
Larvet

(10) Patent No.: US 8,032,644 B2
(45) Date of Patent: Oct. 4, 2011

(54) SERVICE CREATION METHOD, COMPUTER PROGRAM PRODUCT AND COMPUTER SYSTEM FOR IMPLEMENTING THAT METHOD

(75) Inventor: Philippe Larvet, Forges les Bains (FR)

(73) Assignee: Alcatel Lucent, Paris (FR)

( * ) Notice: Subject to any disclaimer, the term of this patent is extended or adjusted under 35 U.S.C. 154(b) by 124 days.

(21) Appl. No.: 12/161,883

(22) PCT Filed: Jan. 23, 2007

(86) PCT No.: PCT/EP2007/050639
§ 371 (c)(1), (2), (4) Date: Jan. 14, 2009

(87) PCT Pub. No.: WO2007/085589
PCT Pub. Date: Aug. 2, 2007

(65) Prior Publication Data
US 2009/0216884 A1    Aug. 27, 2009

(30) Foreign Application Priority Data

Jan. 24, 2006   (EP) ..................... 06300061

(51) Int. Cl.
*G06F 15/16* (2006.01)
*G06F 12/00* (2006.01)
(52) U.S. Cl. ..................... 709/229; 709/217
(58) Field of Classification Search .......... 709/225–229, 709/217–218, 203, 250
See application file for complete search history.

(56) References Cited

U.S. PATENT DOCUMENTS

| 7,698,398 B1 * | 4/2010 | Lai ............................... 709/223 |
| 2003/0163450 A1 * | 8/2003 | Borenstein et al. .............. 707/1 |
| 2004/0078593 A1 * | 4/2004 | Hind et al. .................... 713/201 |
| 2005/0076135 A1 * | 4/2005 | Song et al. .................... 709/230 |
| 2006/0041641 A1 * | 2/2006 | Breiter et al. ................. 709/219 |
| 2006/0253476 A1 * | 11/2006 | Roth et al. .................... 707/100 |
| 2007/0005739 A1 * | 1/2007 | Carey et al. ................... 709/223 |

OTHER PUBLICATIONS

Paar et al, "Semantic software engineering approaches for automatic service lookup and integration" Autonomic Computing Workshop, 2003. Proceedings of Jun. 25, 2003, Piscataway, NJ, USA, IEEE, 2003, pp. 108-115, XP010644231.

* cited by examiner

*Primary Examiner* — Zarni Maung
(74) *Attorney, Agent, or Firm* — Sughrue Mion, PLLC

(57) ABSTRACT

The invention discloses a method (100) for creating a service based on a request. This method comprises a step of semantically analyzing (30) a natural-language request, such as one sent (20) from a mobile telephone or a personal digital assistant (150). In this manner, the request may be formulated (10) in natural language, without needing to possess any technical knowledge whatsoever. The semantic analysis (30) makes it possible to identify (35) Web service requirements (or specifications). Next, Web services are determined (40) and sequenced (50) based on the identified service requirements. A new service is then made available, such as to the user who made the natural-language request.

7 Claims, 1 Drawing Sheet

Figure 1:
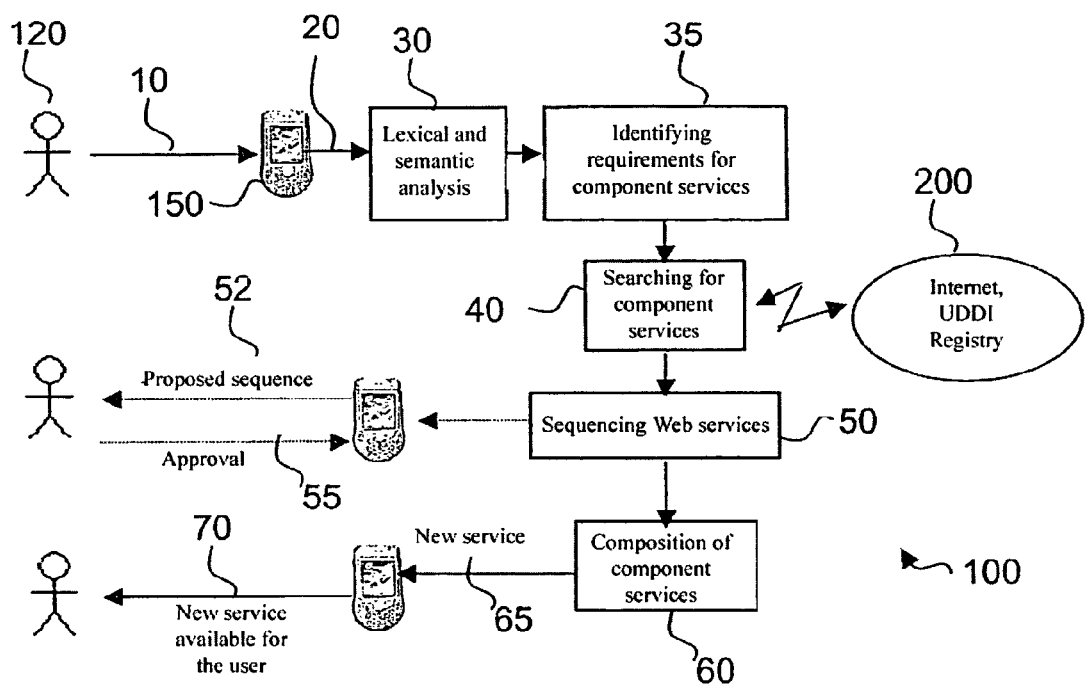

SERVICE CREATION METHOD, COMPUTER PROGRAM PRODUCT AND COMPUTER SYSTEM FOR IMPLEMENTING THAT METHOD

This invention pertains to a service creation method, as well as a computer program product and a computer system for implementing that method.

In this description, the following terms are used with the meaning indicated, unless otherwise stated:

"UDDI registry", for "Universal Description Discovery and Integration", refers to an XML-based registry, more particularly one devoted to web services, in particular within SOA architectures (short for "Service-Oriented Architectures"). Both private and public registries exist, as do specific registries for certain service providers. A UDDI registry makes it possible to locate a searched-for Web service on a network. In particular, it comprises information for accessing Web services and contextual information, such as a brief description of the services and their functionalities. The UDDI registry, in particular, contains:
  white pages comprising business-related information;
  yellow pages, which list the Web services of these businesses using the WSDL standard; and
  green pages providing specific technical information on the services provided. This technical information pertains to, among other things, descriptions of the services, links, or business processes associated with it.

"computer application": refers to any program or any set of programs intended to work together, whose purpose is to render the service to their users.

"BPEL": BPEL, short for "Business Process Execution Language," is an XML language used for the formal notation of interaction logics and interaction protocol logics, which extends the semantics of the Web services interaction model. In addition to interactions between Web services, BPEL describes the application logic and the order of the interactions.

"composition": in the context of Web services, refers to an aggregation of services that may act as a new discrete Web service. A distinction will be made between composition through "orchestration", in which emphasis is placed upon the ordering of the processes performed by the composed services, and composition through "choreography", in which the ordering of the services is based on messages exchanged and on the consideration of events by the composed services.

"input parameter" refers to data provided as input to a processing operation of a Web service; the operation's input data are converted by the operation to provide the output result.

"output result" refers to information resulting from the processing performed by a Web service operation on its input data (or "parameters"). The output result is the product expected by the user of the Web service, said user potentially being a computer application or another Web service.

"RSS" (for "Really Simple Syndication") is a format used to describe the content of a Web page, based on XML, which makes it possible to automatically index the content of a website and make it available.

"Web service" refers to an application accessible over the Internet, via a standard interface, which may dynamically interact with applications or other Web services by using communication protocols, such as those based on XML, and may do so regardless of which operating system and programming languages are used. With respect to its actual interfaces, a Web service comprises processing operations that provide results based on input data, or "input parameters". To use a Web service, one of the operations is called by providing it with the expected input data, and the output result is retrieved.

"SGML": a standardized language used to describe the relationships between the content of a digital document and its structure.

"WSDL" is a language standardized by the W3C (version 1.1 dated Mar. 15, 2001—see http://www.w3.org/TR/wsdl), one which, in particular, makes reference to XML. WSDL describes an interface for public access to a web service using the following elements: name of the service, operations, types of data manipulated, and the links between these types and these operations. In this manner, WSDL indicates how to communicate in order to use the service, the communication protocol, and the message format required to communicate with this service.

"XML" (for "eXtensible Markup Language"): an improvement on the SGML language, one which, in particular, is used by the designers of HTML documents to define their own tags, for the purpose of personalizing the structure of the data.

Modern telecommunications technologies, in particular the Internet, enable users to quickly access a variety of services. Whenever a problem arises on a recurring basis, it is common to create an appropriate service, in order to meet the repeated demands of users. For example, some Internet search engines offer advanced features such as machine translation. However, certain problems that may befall a user are not solved by an existing service. In particular, sometimes a user (who does not have special technical knowledge) may wish to access a service that solves a one-time problem, without such a service existing. For example, the user of an IP terminal (such as a mobile telephone, a personal digital assistant, a pocket PC, etc.) may wish to obtain a translation of a given RSS service into his or her native language.

A need therefore exists for a method for creating a service based on a (user) request as well as for a computer program product and a computer system for implementing this method.

To that end, the invention discloses a method for creating a service based on a request, comprising steps of: semantically analyzing a natural-language request; identifying the Web service requirements based on the semantic analysis conducted; and determining and sequencing the Web services based on the identified service requirements.

In preferable embodiments, the inventive method for creating a service comprises one or more of the following characteristics:
  the process further comprises a step of orchestrating the sequenced Web services;
  the step of determining Web services comprises accessing a UDDI registry;
  the step of semantically analyzing the request comprises a lexical and semantic analysis;
  the step of determining and sequencing is divided into a step of determining Web services, and then sequencing the determined Web services;
  the step of determining Web services comprises: identifying Web service characteristics based on a description of Web services; comparing at least some of these characteristics to the identified requirements; and determining Web services depending on a result of the comparison;

the step of sequencing the Web services further comprises a step of sequencing depending on the identified requirements;

the identification stage of web services characteristics comprises, for each of the services: accession to a description of the web service; and the identification of the characteristics of this service from the description of this service;

The description of the Web service is in the WSDL language;

the step of identifying characteristics comprises a semantic analysis of the description of Web services;

the step of sequencing comprises a compatibility test involving at least one identified characteristic for each of the determined services;

the identified characteristics comprise, for each of the services: at least two sets each with at least three fields, with a first field of one of the sets pertaining to a service input; a first field of the other one of the sets pertaining to an output of the service; a second field of each of the sets pertaining to a type of data related to the first field and a third field of each of the sets pertaining to a semantic tag related to the first field, the step of composition comprising a compatibility test step involving the three fields of each of the sets.

The inventive method further comprises a step of creating a new Web service based on the determined and sequenced Web services; and The method of the invention further comprises the steps: of receiving approval for the determined and sequenced Web services; and the providing of a new Web service.

The invention also pertains to a computer program product capable of implementing the steps of the inventive method.

The invention also pertains to a computer system comprising code means capable of implementing the steps of the inventive method.

Other characteristics and benefits of the invention will become apparent upon reading the following detailed description of embodiments of the invention, which are given only by way of example and with reference to examples, as well as an attached diagram (sole FIGURE), which depicts the steps and components of method according to one embodiment of the invention.

In this manner, the invention discloses a method for creating a service based on a request. This method comprises a step of semantically analyzing a natural-language request, such as one sent from a portable telephone or personal digital assistant. Thus, the request may be formulated in natural language, without it being necessary to possess any technical knowledge whatsoever. The semantic analysis conducted makes it possible to identify Web service requirements (or specifications). Next, a determination and sequencing of Web services are performed based on the identified service requirements. A new service is then made available, such as to the user who made the corresponding natural-language request. The inventive method makes it possible, based on (for example) a request expressed in natural language from a mobile telephone, to create a new service by aggregating existing component Web services found on the Internet, and then to make this new service available to the user, after (if applicable) approving of a proposed sequence of component services.

This method is preferably implemented within an "integrated" computing tool, such as an assistant or application comprising multiple coupled software modules, each of these modules being assigned to a given task.

The sole FIGURE depicts the steps and components of the method according to one embodiment of the invention.

Referring to this FIGURE, the inventive service creation method 100 comprises a step of semantically analyzing 30 a natural-language request.

This request may, for example, have been formulated (step 10) by a user 120 from a personal digital assistant 150. It was the then transmitted over a telecommunications network (step 20) and received by a server (not depicted). This text may, for example, be as follows: "I want to get the text of Reuters bulletins translated into German".

It should be noted that it is possible to implement the above-mentioned computing tool either server-side or client-side, such as within said client's mobile telephone or personal digital assistant.

The step of analyzing 30 a request may, for example, be performed using a syntactic analyzer (or "parser", i.e. a tool capable of analyzing a description based on the recognition of syntactic units) or syntactic analysis routine coupled to a semantic analyzer. We will refer to this coupling of a syntactic analysis and a semantic analysis as the (first) "semantic module". This module is, by definition, capable of being integrated into the above-mentioned computing tool, and its purpose is to conduct a semantic analysis of the request.

This analysis makes it possible to logically structure the request in a computer-readable format. Various semantic analysis techniques of natural-language texts are known. Typically, names, their respective definitions, and operations between these names are extracted or deduced from the request. To do so, dictionaries or grammatical analysis are used, as is known in the prior art.

In particular, the step 30 of semantic analysis may firstly comprise a lexical analysis. In the previous example, a first result of the lexical analysis is a list of relevant words or, as needed, their standard forms (the irrelevant words are ignored). This list is depicted in table 1.

TABLE 1

| Relevant words | Standard forms | Synonyms |
|---|---|---|
| get | | |
| German | German | |
| translated | translation, translate | version |
| text | | |
| Reuters | | |
| news | | bulletins, current events |

Secondly, a piece of context-specific semantic information may be added by the semantic analysis module, as indicated in table 2.

TABLE 2

| Relevant words | Standard forms | Synonyms | Additional semantic information |
|---|---|---|---|
| get | | | display |
| German | German | | language |
| translated | translation, translate | version | |
| text | | | |
| Reuters | | | company name |
| news | | bulletins, current events | bulletins, current events, feeds |

The step of lexically and semantically analyzing the request then makes it possible to identify (step 35) requirements (i.e. "specifications") for component Web services. In the previous example, taking into account the additional semantic information and the grammatical form of the original request, the semantic module may produce the following requirements for the component services:

get/show the text
translation of/version of/translate the text
language=German
news/bulletins/events/feeds
company name=Reuters Furthermore, it is possible to structure these requirements in a format comparable to WSDL format (see definition above), in order to facilitate the following steps, i.e. determining 40 and sequencing 50 Web services. Details will be provided later on.

This double step 40, 50 is preferably divided into a step of determining 40 Web services in and sequencing 50 the determined Web services. In this manner, after the services have been determined, a sequence may be proposed for approval (step 52) to a user. The user may then approve it (step 55) or compose its own sequence, which then gives rise to machine sequencing, handled here by a suitable module.

Alternatively, the Web services may also be determined one after another, and then submitted for partial and gradual sequencing. In such a case, the steps of determining 40 and sequencing 50 are nested. After sequencing is complete, the sequence may still, however, be submitted to a user for approval. Again, it should be noted that multiple sequences may be proposed, in an order calculated based on predetermined criteria.

In one embodiment, the step of determining 40 Web services comprises the identification of characteristics of Web services based on a description of said Web services. During this step, the Web services available may, for example, be systematically reviewed. For each of them, characteristics are identified, and a comparison is made between at least some of these characteristics and the requirements that had previously been set. This then makes it possible to determine Web services based on a result of the comparison.

And a more detailed manner, regarding the identification of characteristics of Web services, a standardized description of these services is used. Preferably, individual descriptions of Web services are used. In this manner, for a given Web service, the above-mentioned computing tool accesses a description of the service and then identifies the specific characteristics based on its description. It should be noted that these characteristics do not explicitly exist as such within the description of the service. They are deduced by the inventive method.

It is preferable to use individual descriptions of Web services, especially if the description catalogue, such as a UDDI registry, as defined above, is available.

Preferably, each description of services is in WSDL language, as in, for example, UDDI registries. In this manner, a standardized description is available for each Web service. Furthermore, such a description is always available on a registry server, as it is automatically built by this server from an interface outside of the published Web service. This offers greater compatibility with the method.

Furthermore, it is possible to automatically analyze such descriptions, such as by using a syntactic analyzer (or "parser", as described above). A (second) semantic module is referred to below. This second module's function is therefore to semantically analyze the WSDL description.

In greater detail, the syntactic analyzer may, for example, comprise a lexical analysis, such as one known in the prior art. A semantic analysis of the descriptions of Web services is then conducted, in order to determine the meaning of the extracted lexical components.

Analyzing the descriptions of the services makes it possible to identify characteristics for each of the services. For example, it makes it possible to identify sets of characteristics for each of the operations of the services. These characteristics will later be used to determine the connectivity of the identified services.

As the previously set requirements and the identified characteristics are preferably structured similarly, comparing them is made easier (such as by being based on number of shared characteristics) and faster. Upon the completion of this comparison and for a given set of requirements, one Web service (or more) is determined. If applicable, it may then be useful to determine rankings and then to retain only the "best" service (within the meaning of the comparison).

Upon the completion of the step of determining 35 component Web services, a given number of known services are available. It is then desirable to compose these services based on a logic expressed in the request.

To do so, identified characteristics may be used as a basis, said characteristics reflecting the previously set requirements. These characters will then make it possible to determine service connectivity, i.e. the propensity of the services to connect. Next, it will be possible to automatically compose these services based on their connectivity.

Among the characteristics of Web services, one may, for example, seek to identify at least one input and/or output for each of the operations of a given Web service.

More generally, one may, for example, search for the inputs-outputs of each operation of each service, as "input parameters" or "output results" (see the definitions of these terms above). In this manner, it will then be possible to test the connectivity of the Web services by comparing the input/output characteristics of their operations. For example, a service A that has an operation providing an output compatible with an input of an operation of a service B may connect to service B.

In order to determine the connectivity of the services, and with an eye towards future compositions of these services, it may possible, in one embodiment, to create a set of characteristics for each input and each output of the operations of a given Web service.

If one operation of a Web service has multiple inputs or multiple outputs, a corresponding number of sets may be created once the description of the Web service has been analyzed.

In addition to the name of the parameter itself, these sets may, for example, each have three fields (or more, depending on the test model that is planned). However, it should be noted that it may turn out to be sufficient to use two fields depending on how the WSDL description is interpreted.

Each set may therefore preferably have three fields and pertain to an input parameter or an output result of an operation of the Web service. A first field pertains to the input or output information for the parameter or result in question. A second field of each set specifies the type of data of the parameter or result. The type of data is one of the elements found in the WSDL description of the service. A third field pertains to a semantic tag (or "SemTag" in the example below), which will be associated with the parameter or result. A semantic tag may be viewed here as a name, a string of characters, or more generally, a code associated with the data and serving to further characterize it semantically. It should be noted that if the type may be extracted directly from a WSDL description, the tag is placed after this same description is analyzed.

The characteristics compatibility test may then involve each field of each set.

A second semantic module, mentioned above, may be used, typically forming an integral part of the aforementioned computing tool, to place a semantic tag on each type of data, both at input and at output. This tag specifies the nature of the input/output data and thus specifies how the data is processed. In this manner, each piece of input/output data is described by a triplet:

{input or output, type of data, semantic tag}.

Shown below is an extract of an XML file corresponding to a semantic description, using three fields, of the inputs of a Web translation service which will be mentioned later (this XML file extract is the result of semantic processing performed on a corresponding WSDL file):

```
...
    <input>
        <param name="src_lang" type="string" semtag="language" />
        <param name="dest_lang" type="string" semtag="language" />
        <param name="text_to_tr" type="string" semtag="text" />
    </input>
...
```

In this manner, it may be seen that every parameter, in addition to the input information, bears three fields corresponding to its name, its type, and its semantic tag ("semtag"). The three pieces of information which will then be used during the test for compatibility between services are: the input or output information, the type information, and the semantic tag.

More detailed explanations are now given regarding the semantic analysis.

Whenever a WSDL file is analyzed: four main parts may be identified, which correspond to the types, messages, operations, and name of the service. Furthermore, other information corresponding to the "PortType" and the "Binding" are identified (these two terms being conventional terms of a WSDL description), which will serve to create a connection between the inputs/outputs of the operation and the messages.

A first, and purely syntactic, analysis level of the WSDL description makes it possible to obtain the "useful" syntactic structure of the service, i.e. the necessary and sufficient information. This information is mainly obtained from the four above-mentioned parts. The elements which are not useful for searching are removed. The remaining information is reordered and interconnected using "Binding" and "PortType" information. This is easily achieved using a syntactic analyzer. At this level, the semantic data is not yet added.

By way of example, the useful syntactic structure obtained for the translation service is as follows (with the terms taken from XML language):

```
<service name="Translator">
    <types /> //this input is empty, as there are no complex types
    in this example
    <operation name="Translate">
        <input>
            <part name="lang" type="string">
            <part name="text" type="string">
        </input>
        <output>
            <part name="TranslateResult" type="string">
        </output>
    </operation>
</service>
```

Based on the useful syntactic structure, a narrower analysis is conducted using the second semantic module. This module may, for example, be tasked with the following operations. It picks out the terms that are used (above, the terms "Translate", "lang", "text", "TranslateResult", etc.) and breaks them up (these terms are generally written in a manner similar to the terms used in programming language, or are separated by characters such as "_", etc.) in order to "deconcatenate" these terms. The module then expands the truncated terms, if necessary (such as by searching in a dictionary). In the previous example, this gives: "translate", "text", and "translate result". After this is done, using appropriate dictionaries, it tries to associate a noun with each verb encountered, as well as the definitions of each noun. If applicable, it examines these definitions in order to retain one rather than another. Complementary techniques are known, which make it possible, if applicable, to simplify these processing tasks and achieve easily usable results.

The main purpose of the fifth step, given above, is to add a semantic tag to each of the names of each input/output of the service's aforementioned useful syntactic structure. In this manner, the tag "text" will be placed for the corresponding input "text". In this manner, a reworked description of the service is obtained. In the example of the translation service, a description similar to the extract of the XML file described above is obtained.

Placing a semantic tag—which may be viewed as a "supertag"—makes it possible to efficiently determine the connectivity of the Web services. Other semantic analysis techniques, however, may be used for this placement.

At this point, all components enabling one Web service to connect to another are present.

In the following, the step of determining the connectivity of Web services is described using an example.

In this example, a user expresses in his request that he wishes to see displayed the results of a translation of an RSS feed (such as one drawn from a newspaper's website) from a translation service and an RSS service. An RSS feed, automatically reproduces, in particular, either headlines or the full text from a news site. This format is particularly employed to make use of pages whose contents are updated regularly.

In this case, it is presumed that at this point, the request has been transmitted and then analyzed, the Web service requirements have been drawn from it, and finally, these Web services have been discovered by consulting a UDDI registry. Therefore, the necessary Web services are available. Now, one problem that arises is how to automatically compose these services to obtain a machine translation of a piece of RSS content.

Firstly, a Web service for translation is available, which possesses an input (a text written in a first language, or "language 1") and an output (another text written in a second language, or "language 2"). The analysis of the corresponding WSDL description leads to the identification of input and output data, described by the following sets of triplets:

{input 1, type=string, semantic tag=text to be translated};
{input 2, type=string, semantic tag=language 1};
{output 1, type=string, semantic tag=translated text}; and
{output 2, type=string, semantic tag=language 2};

The word "string" refers to a string of characters.

A Web service providing an RSS feed is also available. This Web service may, for example, after analysis conducted by the aforementioned tool, provide outputs specified as follows:

{output 1, type=string, semantic tag=headline};
{output 2, type=string, semantic tag=language of the headline};
{output 3, type=string, semantic tag=description}; and {output 4, type=string, semantic tag=language of the description};
....

Furthermore, a display service is available, whose identified characteristics after analysis may read as follows:
{input=text to be displayed, type=string, semantic tag=text}; and
{output=display, type=screen, semantic tag=display};

The connectivity of each of the services to be composed is then determined, preferably two at a time. To do so, a semantic correspondence between the input(s) of one of the Web services and the output(s) of another service, i.e. compatibility between two semantic triplets, may be searched for.

This compatibility may, in particular, meet three conditions:
a) the first triplet pertains to an output, the other to an input
b) both types are identical or compatible
c) both semantic tags are identical or compatible.

For this purpose, a compatibility table may be provided for and made available to the aforementioned computing tool.

In the example above, compatibility is automatically found in this direction:
RSS service->Translation service->Display service Indeed, a table made available to the semantic module may make it possible to create a perfect two-at-a-time match, using each of the services.

On the other hand, the sequence "RSS service->Display service->Translation service" will not be considered, because of the semantic incompatibility between the output of the display service and the input of the translation service.

It should be noted that an iterative process or "repeat processing" may, if applicable, be adopted in order to couple a given number of outputs of the same type from a first service to an input from another service. This is particularly useful in the previous example. In this way, each RSS service output (title, description, etc.) is translated and then displayed.

In further detail, the determination of the connectivity of Web services may be performed in two steps:
i) first, based on a logical ordering drawn from examining their respective inputs-outputs; and
ii) next, by the connection of the inputs-outputs themselves, based on the detailed descriptions of their semantic tags and their types (by performing the aforementioned compatibility test).

In this manner, a specific module is tasked with comprehensively determining an order for the orchestration of the services (service X comes before service Y, etc.) and then determining, on a more detailed level, which output of a service connects to which input of another service.

The comprehensive orchestration order may, if applicable and as mentioned above, be proposed (step 52) to the user for approval (step 55). This user may, however, decide to change this order, or to bring in another service.

The orchestration order may, for example, be determined based on heuristics that may be implemented within a rules database and placed under the control of an inference engine. For example, if a service A possesses, at its input-output, semantic tags corresponding to text, and a service B has, at its input, different or incompatible tags, then the order will preferentially be: B then A.

In the example described above: first, the RSS service is called, whose output has semantic tags corresponding to text (the input tag may, for example, correspond to a Web address, and is different from "text"). Next, the translation service, which has a tag corresponding to text at its input and its output, is called. Furthermore, the output of the RSS service may be connected to the input of the translation service.

In view of the manifest incompatibilities that may be seen from comparing the semantic and type tags, the proposed automatic connections will be as follows:
the text output corresponding to headlines of the RSS service may be connected to the (sole) text input of the translation service; and
the text output corresponding to a description of the RSS service may be connected to the (sole) text input of the translation service.

These proposals may be kept directly for the following step of composition, or, if applicable, approved by a user, as indicated above.

Next, once connectivity has been established, the actual composition of the Web services, depending on their connectivity, is performed by a special assembly module. To that end, a string of connections may, for example, be translated into a formal orchestration or choreography language, such as BPEL (see definition at the beginning of the document). The string of connections may then be submitted to an orchestration engine, which will be tasked with executing it (step 60), as it is a discrete Web service. In particular, a string of connections of the following type:
"Input 1" of service A=>product "output 1"
->"Input 2" of service B=>product "output 2"
->"Input 3" of service C=>product "output 3",
may be translated and then submitted to an orchestration engine, which will execute it as a discrete service D made up of A, B, and C, and which, given input 1, may directly provide "final result 3".

The assembly module then makes it possible to automatically connect Web services.

In this manner, a service automatically composed (step 60) by the aforementioned computing tool is obtained.

The service composed in this manner is made available to the user (steps 65, 70).

In one alternative, the service may furthermore remain (in such a case, it is created) available to the user, and may remain so for a given period of time, if applicable.

The integration of this tool into certain applications makes it possible to obtain the composition of services in real time. In the example above, it is possible to obtain an RSS feed translated into a desired language, upon request to do so, specifying the necessary elements.

Naturally, other examples and compositions may be foreseen.

The invention claimed is:

1. A method for creating a service from a request, comprising:
semantically analyzing a request in natural language;
identifying Web service requirements based on the semantic analysis performed; and
determining and sequencing Web services depending on the identified service requirements,
wherein the step of semantically analyzing the request comprises:
a lexical and semantic analysis,
wherein the step of determining and sequencing is divided into a step of determining Web services and then sequencing the determined web services, and
wherein the step of determining Web services comprises:
identifying characteristics of Web services based on a description of Web services;
comparing at least some of these characteristics with the identified requirements; and
determining Web services based on a result of the comparison.

2. The method of claim 1, wherein the step of identifying characteristics of Web services comprises, for each of the services:
   accessing a description of the Web service; and
   identifying characteristics of that service based on the description of that service.

3. The method of claim 2, wherein the description of the Web service is in WSDL language.

4. The method of claim 1, wherein the step of identifying characteristics comprises a semantic analysis of the descriptions of Web services.

5. The method of claim 1, wherein the identified characteristics involve an input and/or an output for each of the determined services.

6. The method of claim 5, wherein the identified characteristics comprise, for each of the services:
   at least two sets, each with at least three fields, wherein:
   a first field of one of the sets pertains to an input of the service;
   a first field of another set pertains to an output of the service;
   a second field of each of the sets pertains to a type of data related to the first field;
   a third field of each of the sets pertains to a semantic tag related to the first field; and wherein the composition step further comprises:
   a step of a compatibility test involving the three fields of each of the sets.

7. The method of claim 1, wherein the step of sequencing (50) comprises:
   a compatibility test involving at least one identified characteristic for each of the determined services.

\* \* \* \* \*